United States Patent
Noda et al.

(10) Patent No.: US 10,196,241 B2
(45) Date of Patent: Feb. 5, 2019

(54) ELEVATOR SYSTEM

(71) Applicant: TOSHIBA ELEVATOR KABUSHIKI KAISHA, Kawasaki-shi, Kanagawa (JP)

(72) Inventors: Shuhei Noda, Kanagawa (JP); Kentaro Yokoi, Kanagawa (JP); Hiroshi Sukegawa, Kanagawa (JP); Yukari Murata, Kanagawa (JP); Sayumi Kimura, Kanagawa (JP)

(73) Assignee: TOSHIBA ELEVATOR KABUSHIKI KAISHA, Kawasaki-shi (JP)

( * ) Notice: Subject to any disclaimer, the term of this patent is extended or adjusted under 35 U.S.C. 154(b) by 0 days.

(21) Appl. No.: 15/404,568

(22) Filed: Jan. 12, 2017

(65) Prior Publication Data

US 2017/0197807 A1 Jul. 13, 2017

(30) Foreign Application Priority Data

Jan. 13, 2016 (JP) ................................ 2016-004593

(51) Int. Cl.
*B66B 13/00* (2006.01)
*B66B 13/14* (2006.01)
(Continued)

(52) U.S. Cl.
CPC ............ *B66B 13/143* (2013.01); *B66B 1/468* (2013.01); *B66B 13/26* (2013.01);
(Continued)

(58) Field of Classification Search
CPC ......... B66B 1/468; B66B 3/02; B66B 5/0018; B66B 5/0006
See application file for complete search history.

(56) References Cited

U.S. PATENT DOCUMENTS 5,001,557 A * 3/1991 Begle .................... B66B 13/26
 187/317
5,284,225 A  2/1994 Platt
(Continued)

FOREIGN PATENT DOCUMENTS

EP  0 344 404 A1  12/1989
EP  0 534 714 A2  3/1993
(Continued)

OTHER PUBLICATIONS

Japanese Office Action dated Jun. 7, 2016 as received in corresponding Japanese Application No. 2016-004593 and its English translation thereof.

*Primary Examiner* — Marlon Fletcher
(74) *Attorney, Agent, or Firm* — Foley & Lardner LLP

(57) ABSTRACT

According to one embodiment, an elevator system includes a camera, a passenger detection module and a controller. The camera is capable of imaging a particular range in a direction from a vicinity of a door of a car to a hall when the car arrives at the hall. The passenger detection module detects presence or absence of a passenger who intends to get into the car by focusing on movement of a movable body within a specific area by using a plurality of time-series continuous images which are captured by the camera. The controller controls an opening/closing operation of the door based on a detection result of the passenger detection module. A width of the area is being set greater than at least a width of the door.

9 Claims, 11 Drawing Sheets

(51) Int. Cl.
*B66B 13/26* (2006.01)
*B66B 1/46* (2006.01)
*G06K 9/00* (2006.01)
*H04N 7/18* (2006.01)

(52) U.S. Cl.
CPC ......... *G06K 9/00335* (2013.01); *H04N 7/185* (2013.01); *B66B 2201/4638* (2013.01)

(56) References Cited

U.S. PATENT DOCUMENTS

| | | | | |
|---|---|---|---|---|
| 6,161,654 | A * | 12/2000 | Sirigu | B66B 3/00 187/391 |
| 6,257,373 | B1 * | 7/2001 | Hikita | B66B 1/2458 187/387 |
| 6,328,134 | B1 * | 12/2001 | Hikita | B66B 1/2408 187/382 |
| 7,079,669 | B2 * | 7/2006 | Hashimoto | B66B 1/468 187/247 |
| 2002/0191819 | A1 * | 12/2002 | Hashimoto | B66B 1/468 382/118 |
| 2005/0173199 | A1 * | 8/2005 | Kawai | B66B 5/024 187/313 |
| 2008/0117020 | A1 | 5/2008 | Martin | |
| 2009/0057068 | A1 * | 3/2009 | Lin | B66B 1/34 187/392 |
| 2012/0018256 | A1 * | 1/2012 | Mangini | B66B 5/0043 187/247 |
| 2013/0255154 | A1 | 10/2013 | Kanki et al. | |
| 2017/0197807 | A1 * | 7/2017 | Noda | G06K 9/00335 |
| 2018/0086595 | A1 * | 3/2018 | Guillot | B66B 1/52 |

FOREIGN PATENT DOCUMENTS

| | | |
|---|---|---|
| EP | 2 647 787 A1 | 10/2013 |
| JP | 2001-186501 A | 7/2001 |
| JP | 2008-273709 A | 11/2008 |
| JP | 2011-241002 A | 12/2011 |
| JP | 2012-020823 A | 2/2012 |
| JP | 5201826 B2 | 6/2013 |
| SG | 2013062013 A | 3/2014 |

* cited by examiner

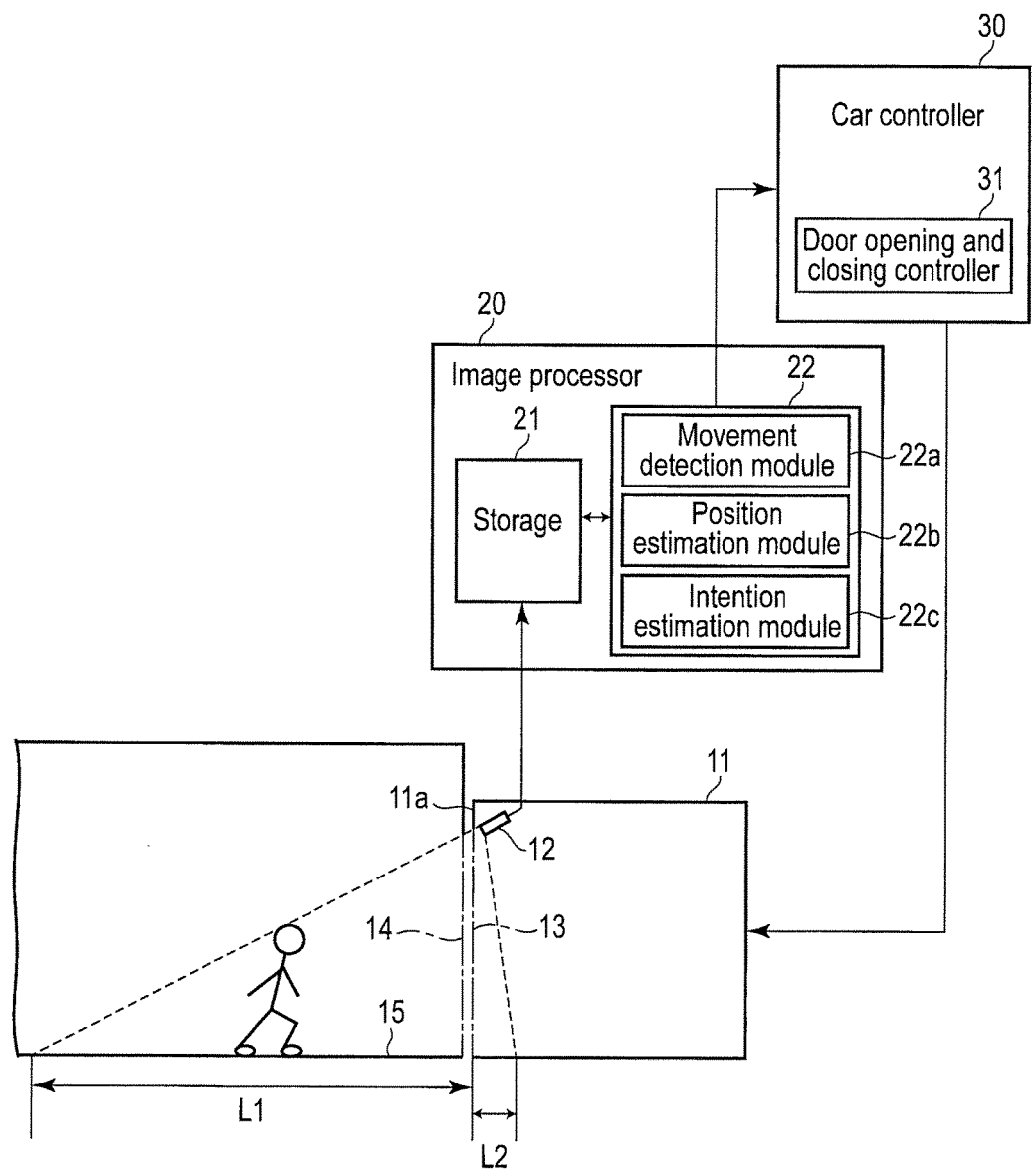
F I G. 1

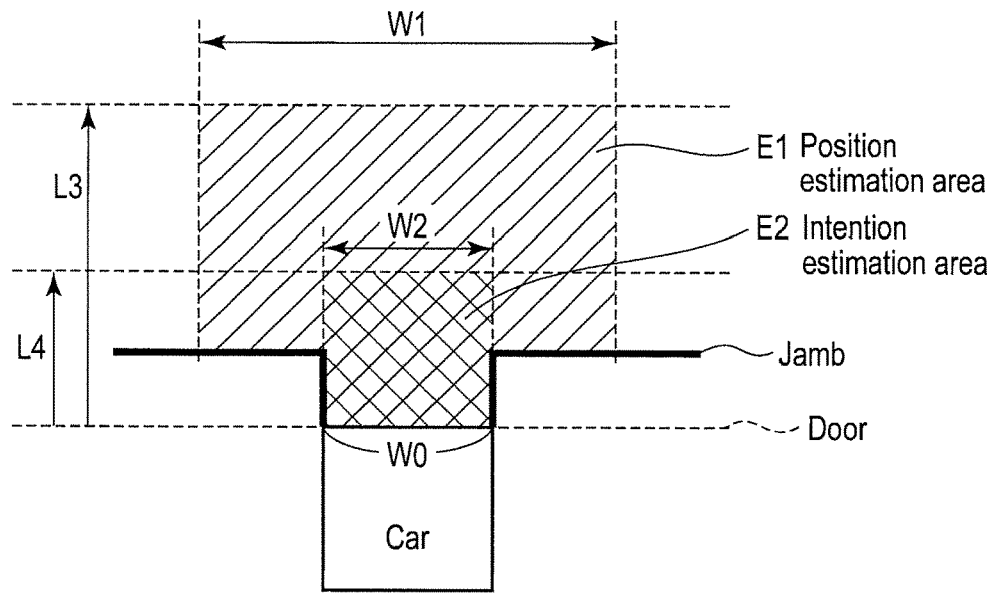
F I G. 4
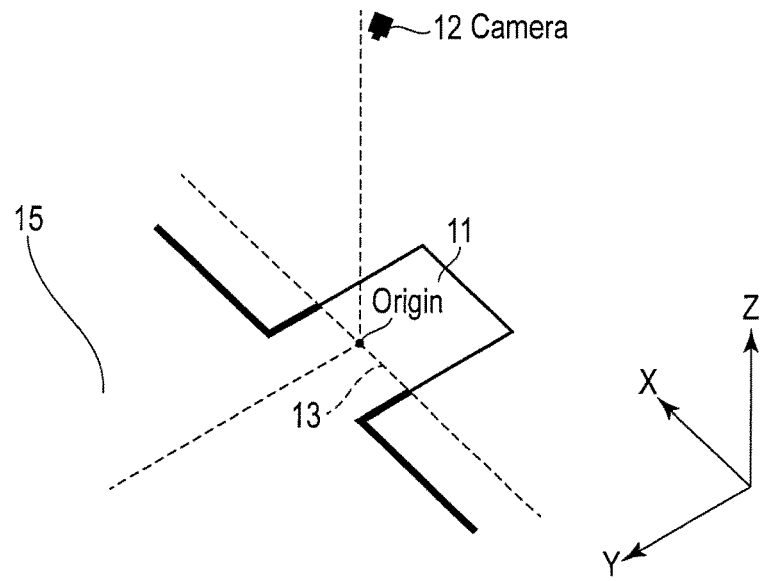
F I G. 5

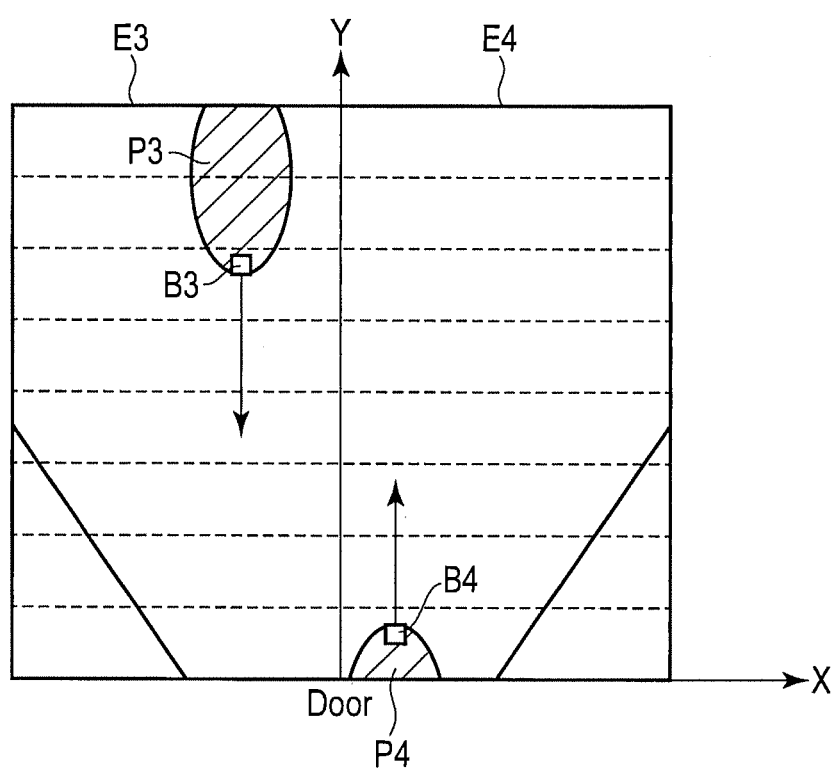
F I G. 14

ELEVATOR SYSTEM

CROSS-REFERENCE TO RELATED APPLICATIONS

This application is based upon and claims the benefit of priority from Japanese Patent Application No. 2016-004593, filed Jan. 13, 2016, the entire contents of which are incorporated herein by reference.

FIELD

Embodiments described herein relate generally to an elevator system which detects a passenger who will get into a car.

BACKGROUND

Generally, when a car of an elevator arrives at a hall and the door is opened, the door is closed after a particular time elapses, and the car departs. At this time, since the passenger of the elevator cannot know when the door starts to close, the passenger may be hit by the door that is closing when he/she gets into the car from the hall.

In order to avoid such a collision with the door at the time of boarding, it has been considered to detect a passenger who will get into the car by a sensor, and control the opening/closing operation of the door. As the sensor, generally, a photoelectronic sensor is used. That is, by installing the photoelectronic sensor at the upper part of the car, a passenger who will get into the car is optically detected. Since the door-opened state is maintained while the passenger is being detected, it is possible to prevent the passenger from being hit by the door that is closing, and also from being drawn into a door pocket of the door.

However, a detection range of the photoelectronic sensor is narrow, and thus, the passengers can be detected only in a focused manner. Accordingly, there are cases where a door closing operation is started since the presence of a passenger who is at a place some distance away from the car cannot be detected, or conversely, the door is opened since a person who has just passed near the car is erroneously detected.

BRIEF DESCRIPTION OF THE DRAWINGS

FIG. 1 is a diagram showing the structure of an elevator system according to an embodiment.

FIG. 4 is an illustration for describing a detection area in real space according to the embodiment.

FIG. 5 is an illustration for describing a coordinate system in the real space according to the embodiment.

FIG. 14 is an illustration for describing movement detection based on region division of a captured image according to another embodiment.

DETAILED DESCRIPTION

Figure 2:
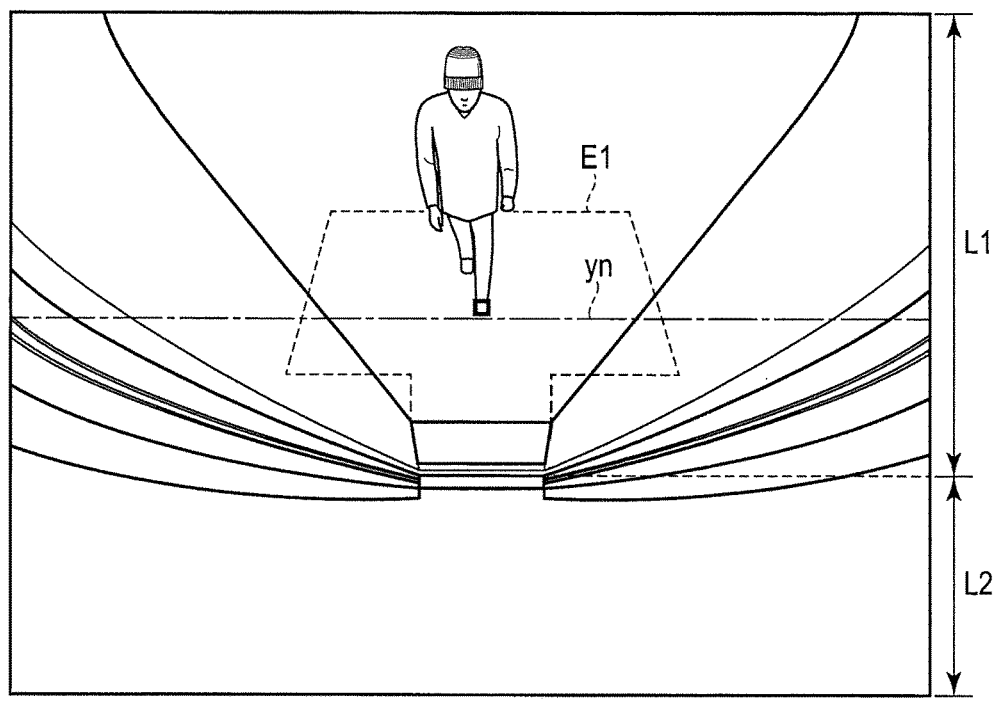
FIG. 2 illustrates an example of an image captured by a camera according to the embodiment.

Embodiments will be described hereinafter with reference to the accompanying drawings.

In general, according to one embodiment, an elevator system includes a camera, a passenger detection module and a controller. The camera is capable of imaging a particular range in a direction from a vicinity of a door of a car to a hall when the car arrives at the hall. The passenger detection module detects presence or absence of a passenger who intends to get into the car by focusing on movement of a movable body within a specific area by using a plurality of time-series continuous images which are captured by the camera. The controller controls an opening/closing operation of the door based on a detection result of the passenger detection module. A width of the area is being set greater than at least a width of the door.

FIG. 1 is a diagram showing the structure of an elevator system according to an embodiment. Note that although explanation will be given below by taking one car as an example, the structure is the same with a plurality of cars.

In the upper part of a doorway of a car 11, a camera 12 is installed. More specifically, the camera 12 is installed within a modesty panel 11a which covers the upper part of the doorway of the car 11 such that a lens portion of the camera 12 faces a hall 15. The camera 12 is a small monitoring camera such as an in-vehicle camera, has a wide-angle lens, and is capable of continuously capturing images at the rate of several frames per second (for example, 30 frames/sec). When the car 11 arrives at each floor and the door is opened, the state of the hall 15 including the state around a car door 13 inside the car 11 is captured.

A capturing range at this time is adjusted to be L1+L2 (L1>L2). L1 corresponds to a capturing range on the hall side, and is 3 m long, for example, from the car door 13 to the hall 15. L2 corresponds to a capturing range on the car side, and is 50 cm long, for example, from the car door 13 to the rear of the car. Note that L1 and L2 are ranges in a depth direction, and it is assumed that a range in a width direction (that is, a direction orthogonal to the depth direction) is greater than at least the width of the car 11.

Further, in the hall 15 of each floor, a hall door 14 is arranged to be openable and closable at an arrival place of the car 11. The hall door 14 opens and closes as it engages with the car door 13 when the car 11 arrives. A power source (a door motor) is in the car side, and the hall door 14 only opens and closes in accordance with the car door 13. In the following descriptions, it is assumed that when the car door 13 is opened, the hall door 14 is also opened, and when the car door 13 is closed, the hall door 14 is also closed.

Each item of image (video) captured by the camera 12 is processed to be analyzed in real time by an image processor 20. Note that although the image processor 20 is depicted in such a way that it is taken out from the car 11 in FIG. 1 for the sake of convenience, in reality, the image processor 20 is accommodated within the modesty panel 11*a* together with the camera 12.

Here, the image processor 20 is provided with a storage 21 and a passenger detection module 22. Further, the passenger detection module 22 may be realized by software, hardware such as an integrated circuit (IC), or a combination of the software and the hardware. Realizing the passenger detection module 22 by software means causing a processor such as a computer processing unit (CPU), not shown, to execute a program stored in a memory which is not shown. The storage 21 includes a buffer area for sequentially saving the images captured by the camera 12, and also temporarily storing data necessary for a process by the passenger detection module 22. The passenger detection module 22 detects the presence or absence of a passenger who intends to get into the car by focusing on the movement of a person/object closest to the car door 13 among a plurality of time-series continuous images which are captured by the camera 12. When the passenger detection module 22 is categorized functionally, the passenger detection module 22 is composed of a movement detection module 22*a*, a position estimation module 22*b*, and an intention estimation module 22*c*.

The movement detection module 22*a* detects a movement of a person/object by comparing the brightness of the respective images in units of one block. The "movement of a person/object" in this specification refers to a movement of a movable body such as a person or a wheelchair in the hall 15.

The position estimation module 22*b* extracts a block closest to the car door 13 from among blocks representing movement which have been detected for each of the images by the movement detection module 22*a*. And, the position estimation module 22*b* estimates a coordinate position (a Y-coordinate shown in FIG. 5) in the direction of the hall obtained from the center of the car door 13 (i.e., the center of the door width) in the extracted block as the position (position of the foot) of the passenger.

The intention estimation module 22*c* estimates whether the passenger intends to get into the car based on a time-series change in the position estimated by the position estimation module 22*b*.

Note that these functions (the movement detection module 22*a*, the position estimation module 22*b*, and the intention estimation module 22*c*) may be provided in the camera 12, or provided in a car controller 30.

The car controller 30 is connected to an elevator control device not shown, and receives and transmits various signals such as a hall call and a car call from and to the elevator control device. Note that the "hall call" corresponds to a signal indicating a call to be registered by operating a hall call button, not illustrated, provided in the hall 15 of each floor, and includes information on the registered floor and a destination direction. The "car call" corresponds to a signal indicating a call to be registered by operating a destination call button, not illustrated, provided inside the car 11, and includes information on a destination floor.

Also, the car controller 30 comprises a door opening and closing controller 31. The door opening and closing controller 31 controls opening and closing of the car door 13 when the car 11 arrives at the hall 15. More specifically, the door opening and closing controller 31 opens the car door 13 when the car 11 arrives at the hall 15, and closes the door after a particular time elapses. However, if the passenger detection module 22 of the image processor 20 detects a passenger who intends to get into the car while the car door 13 is being opened, the door opening and closing controller 31 prohibits the door closing operation of the car door 13 and maintains the door-opened state.

Next, a method of estimating an intention according to the present embodiment will be described referring to FIGS. 2 to 7.

Figure 3:
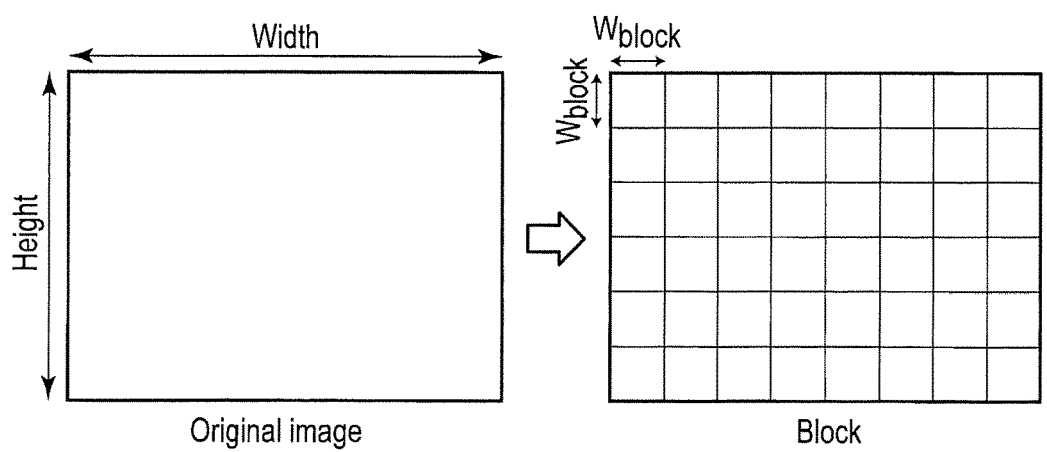
FIG. 3 illustrates the state in which the captured image is divided into blocks according to the embodiment.

FIG. 2 illustrates an example of an image captured by the camera 12. E1 in the drawing represents a position estimation area, and yn represents the Y-coordinate of the detected position of the passenger's foot. FIG. 3 shows the state in which the captured image is divided into blocks. Note that a "block" is defined as a piece having a length of Wblock on one side obtained by dividing the original image like a lattice.

The camera 12 is installed at the upper part of the doorway of the car 11. Accordingly, when the car 11 opens its door at the hall 15, a particular range (L1) on the hall side and a particular range (L2) inside the car are captured. Therefore, when the camera 12 is used, a detection range is increased, and a passenger who is at a place some distance away from the car 11 can also be detected. However, on the other hand, a person who has just passed by the hall 15 (a person who does not get into the car 11) may be erroneously detected, and the car door 13 may be opened.

Hence, the present system is configured such that an image captured by the camera 12 is divided into blocks of a certain size, as shown in FIG. 3, a block representing movement of a person/object is detected, and whether or not the movable body is a passenger who intends to get into the car is estimated by following the blocks representing movement.

Further, in the example of FIG. 3, although the lengthwise and crosswise dimensions of one block are the same, the lengthwise dimension and the crosswise dimension may be different. Further, the blocks may be made to have even sizes throughout the entire region of the image, or may be made to have uneven sizes by gradually reducing the lengthwise (Y-direction) dimension toward the upper part of the image, for example. In this way, the position of the foot which is to be estimated later can be obtained at a higher resolution, or at an even resolution in real space. (That is, when the image is divided evenly, in real space, the farther the block is from the car door 13, the lower the resolution becomes).

FIG. 4 is an illustration for describing a detection area in the real space. FIG. 5 is an illustration for describing a coordinate system in the real space.

In order to detect a movement of a passenger who intends to get into a car from the captured image, first, a movement detection area is to be set for each block. More specifically, as shown in FIG. 4, at least the position estimation area E1 and an intention estimation area E2 are set. The position estimation area E1 is an area for estimating the position of a part of the passenger's body, more specifically, the position of the foot of the passenger, proceeding toward the car door 13 from the hall 15. The intention estimation area E2 is an area for estimating whether the passenger detected in the position estimation area E1 intends to get into the car. Note that the intention estimation area E2 is included in the position estimation area E1, and is also an area for estimating the position of the passenger's foot. That is, in the intention estimation area E2, not only is the passenger's intention of getting into the car estimated, but the position of the passenger's foot is also estimated.

In the real space, the position estimation area E1 has a length of L3 from the center of the car door 13 in the direction of the hall, and the length is set to, for example, 2 m (L3≤capturing range L1 on the hall side). Width W1 of the position estimation area E1 is set to a size greater than or equal to width W0 of the car door 13. The intention estimation area E2 has a length of L4 from the center of the car door 13 in the direction of the hall, and the length is set to, for example, 1 m (L4 L3). Width W2 of the intention estimation area E2 is set to substantially the same size as width W0 of the car door 13.

Note that width W2 of the intention estimation area E2 may be greater than width W0. Also, the intention estimation area E2 may not be a rectangular area in the real space, but may be a trapezoidal area excluding a blind spot of a jamb.

Here, as shown in FIG. 5, the camera 12 captures an image in which a direction horizontal to the car door 13 provided at the doorway of the car 11 is assumed as the X-axis, a direction from the center of the car door 13 to the hall 15 (i.e., the direction perpendicular to the car door 13) is assumed as the Y-axis, and a direction of the height of the car 11 is assumed as the Z-axis. In each of the images captured by the camera 12, by comparing a portion of the position estimation area E1 with a portion of the intention estimation area E2 shown in FIG. 4 in units of one block, a movement of the position of the foot of the passenger who is traveling in the direction from the center of the car door 13 to the hall 15, and vice versa, that is, the direction along the Y-axis, is detected.

Figure 6:
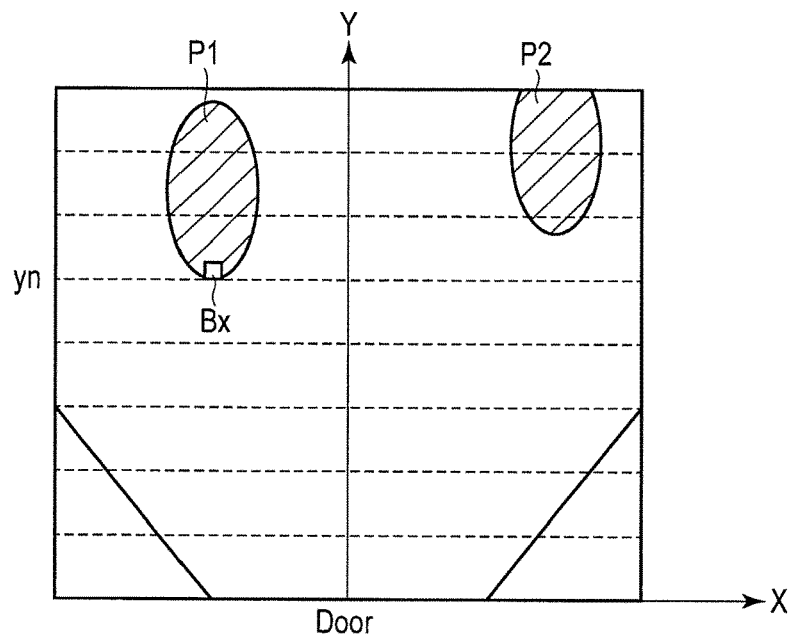
FIG. 6 is an illustration for describing movement detection based on image comparison according to the embodiment, and schematically shows a part of an image captured at time t.
Figure 7:
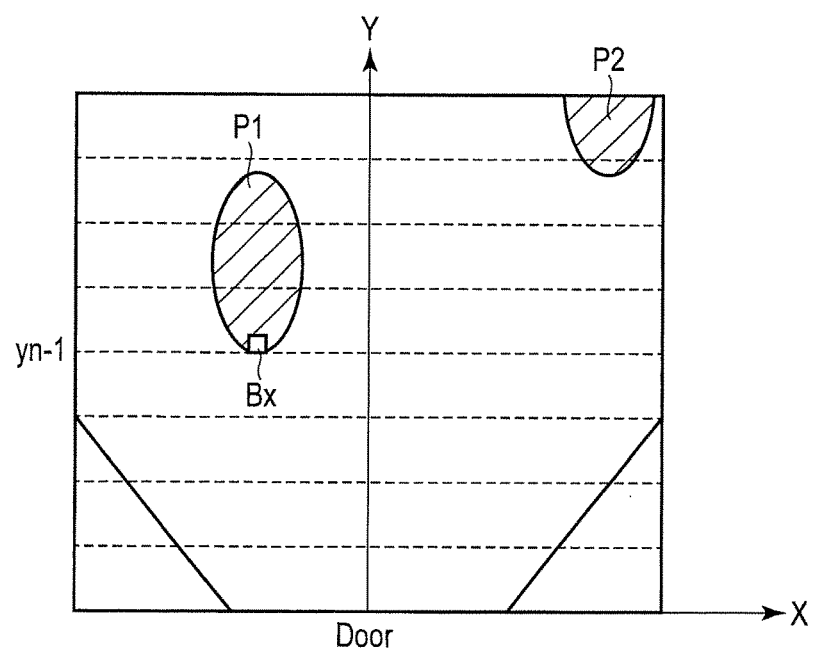
FIG. 7 is an illustration for describing movement detection based on image comparison according to the embodiment, and schematically shows a part of an image captured at time t+1.

FIGS. 6 and 7 show this state.

FIGS. 6 and 7 are illustrations for explaining movement detection based on image comparison. FIG. 6 schematically shows a part of an image captured at time t, and FIG. 7 schematically shows a part of an image captured at time t+1.

P1 and P2 in the figures are the passenger's image portions detected as representing movement in the captured image, and are assembly of blocks detected as representing movement by the image comparison in fact. Block Bx representing movement which is the closest to the car door 13 in image portions P1 and P2 is extracted, and the presence or absence of the passenger's intention of getting into the car is estimated by following the Y-coordinate of that block Bx. In this case, by drawing equidistant lines (horizontal lines at even intervals parallel to the bottom of the car door 13) as shown by dotted lines in the direction along the Y-axis, a distance between block Bx and the car door 13 in the direction along the Y-axis can be obtained.

In the examples shown in FIGS. 6 and 7, a detected position of block Bx representing movement which is the closest to the car door 13 is changed from yn to yn−1, and it can be determined that the passenger is approaching the car door 13.

Next, the operation of the present system will be described in detail.

Figure 8:
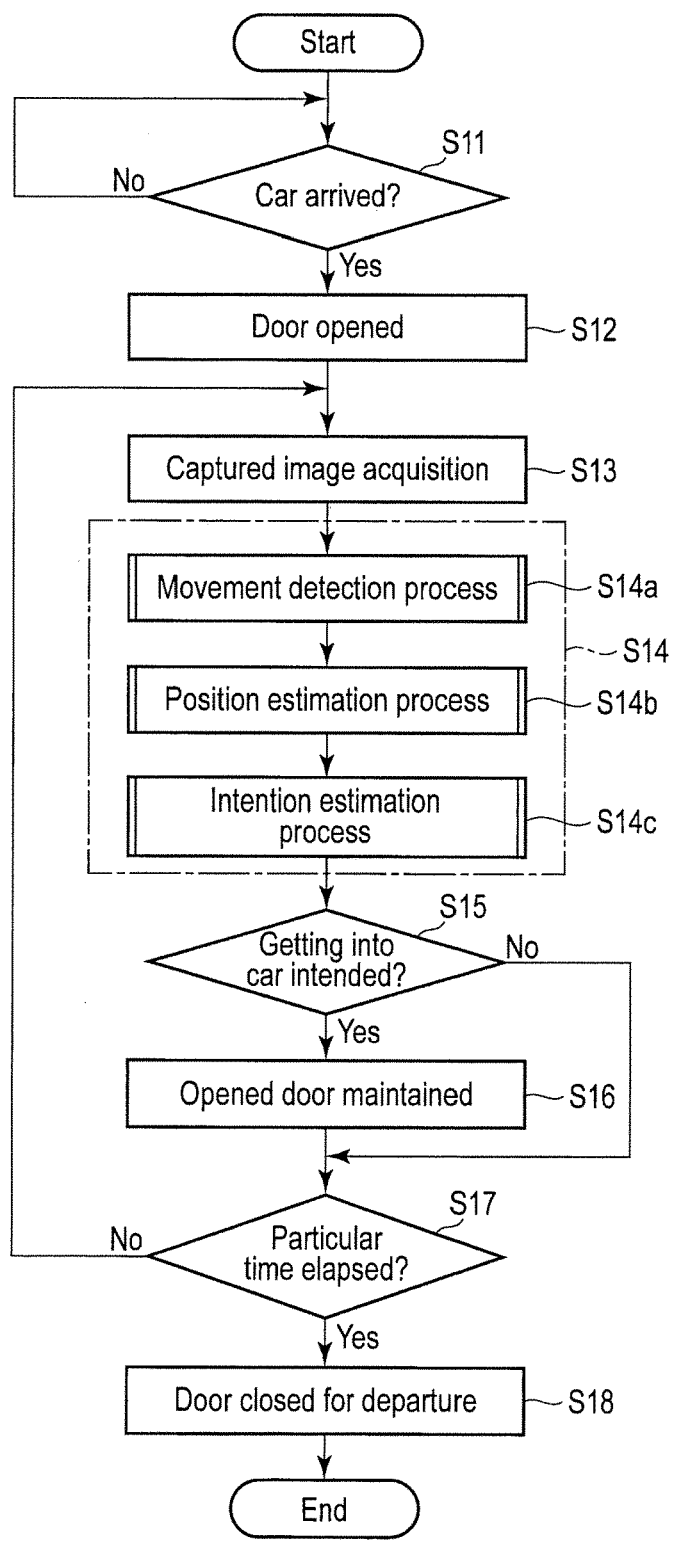
FIG. 8 is a flowchart showing the flow of the entire process in the elevator system according to the embodiment.

FIG. 8 is a flowchart showing the flow of the entire process in the present system.

When the car 11 arrives at the hall 15 of an arbitrary floor (Yes in step S11), the car controller 30 opens the car door 13, and waits for the passenger who will get into the car 11 (step S12).

At this time, by the camera 12 provided at the upper part of the doorway of the car 11, the particular range (L1) on the hall side and the particular range (L2) inside the car are captured at a particular frame rate (for example, 30 frames/sec). The image processor 20 acquires images captured by the camera 12 on a time-series basis, and by sequentially saving these images in the storage 21 (step S13), a passenger detection process as described below is executed in real time (step S14).

The passenger detection process is executed by the passenger detection module 22 provided in the image processor 20. The passenger detection process is categorized into a movement detection process (step S14a), a position estimation process (step S14b), and an intention estimation process (step S14c).

(a) Movement Detection Process

Figure 9:
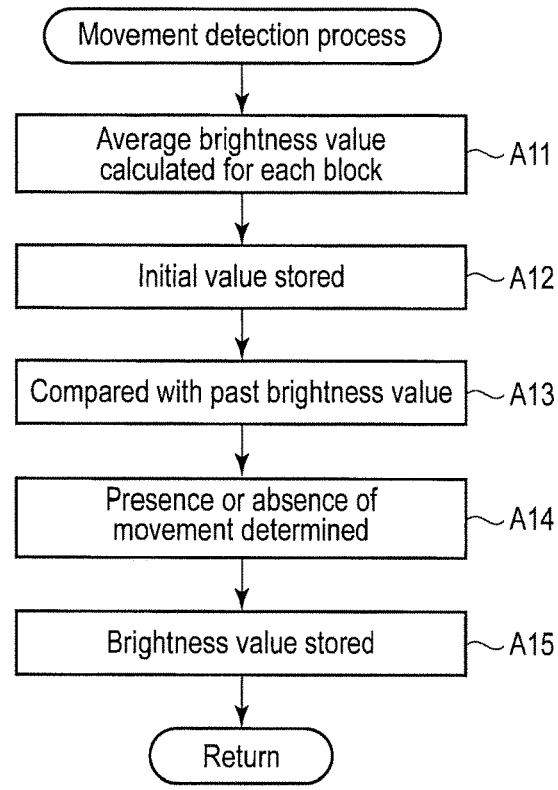
FIG. 9 is a flowchart showing a movement detection process of the elevator system according to the embodiment.

FIG. 9 is a flowchart showing the movement detection process in step S14a described above. The movement detection process is executed in the movement detection module 22a, which is one of the constituent elements of the passenger detection module 22.

The movement detection module 22a reads the images stored in the storage 21 one by one, and calculates an average brightness value for each block (step A11). At this time, it is assumed that the movement detection module 22a stores the average brightness values of the respective blocks calculated when the first image is input as the initial values in a first buffer area not shown in the storage 21 (step A12).

When a second image and the following images are obtained, the movement detection module 22a compares the average brightness value of each block of a current image with the average brightness value of each block of a previous image stored in the first buffer area (step A13). As a result, when a block having a brightness difference which is greater than or equal to a particular value in the current image exists, the movement detection module 22a detects this block as a block representing movement (step A14).

When the presence or absence of movement is detected from a comparison with the current image, the movement detection module 22a stores the average brightness value for each block of this image in the first buffer area for comparison with the next image (step A15).

After this, similarly, the movement detection module 22a repeats detection of whether a person/object has moved by comparing the brightness values of the respective images captured by the camera 12 on a time-series basis in units of one block.

(b) Position Estimation Process

Figure 10:
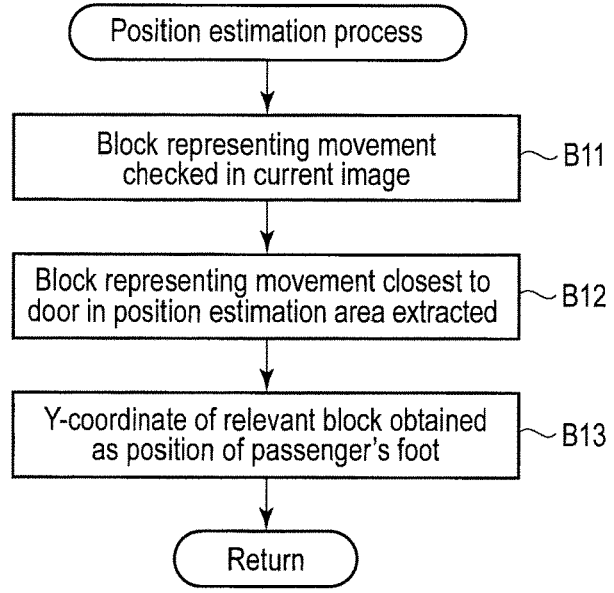
FIG. 10 is a flowchart showing a position estimation process of the elevator system according to the embodiment.

FIG. 10 is a flowchart showing the position estimation process of step S14b described above. The position estimation process is executed in the position estimation module 22b, which is one of the constituent elements of the passenger detection module 22.

The position estimation module 22b checks a block representing movement in the current image based on a detection result of the movement detection module 22a (step B11). As a result, when blocks representing movement exist in the position estimation area E1 shown in FIG. 4, the passenger detection module 22 extracts a block closest to the car door 13 of the blocks representing movement (step B12).

Here, as shown in FIG. 1, the camera 12 is installed at the upper part of the doorway of the car 11 such that the camera 12 faces the hall 15. Accordingly, when the passenger is proceeding toward the car door 13 from the hall 15, it is highly possible that a portion of the passenger's right or left foot will be shown at the front side, in other words, the side close to the car door 13 of the captured image. Hence, the position estimation module 22b estimates the Y-coordinate (the coordinate in the direction of the hall 15 calculated from the center of the car door 13) of the block representing movement which is the closest to the car door 13 as data on the position of the passenger's foot, and stores the data in a second buffer area not shown in the storage 21 (step B13).

After this, similarly, the position estimation module 22*b* estimates the Y-coordinate of the block representing movement which is the closest to the car door 13 for each image as data on the position of the passenger's foot, and stores the data in the second buffer area not shown in the storage 21. Note that such a process of estimating the position of a foot is similarly carried out not only in the position estimation area E1, but also in the intention estimation area E2.

(c) Intention Estimation Process

Figure 11:
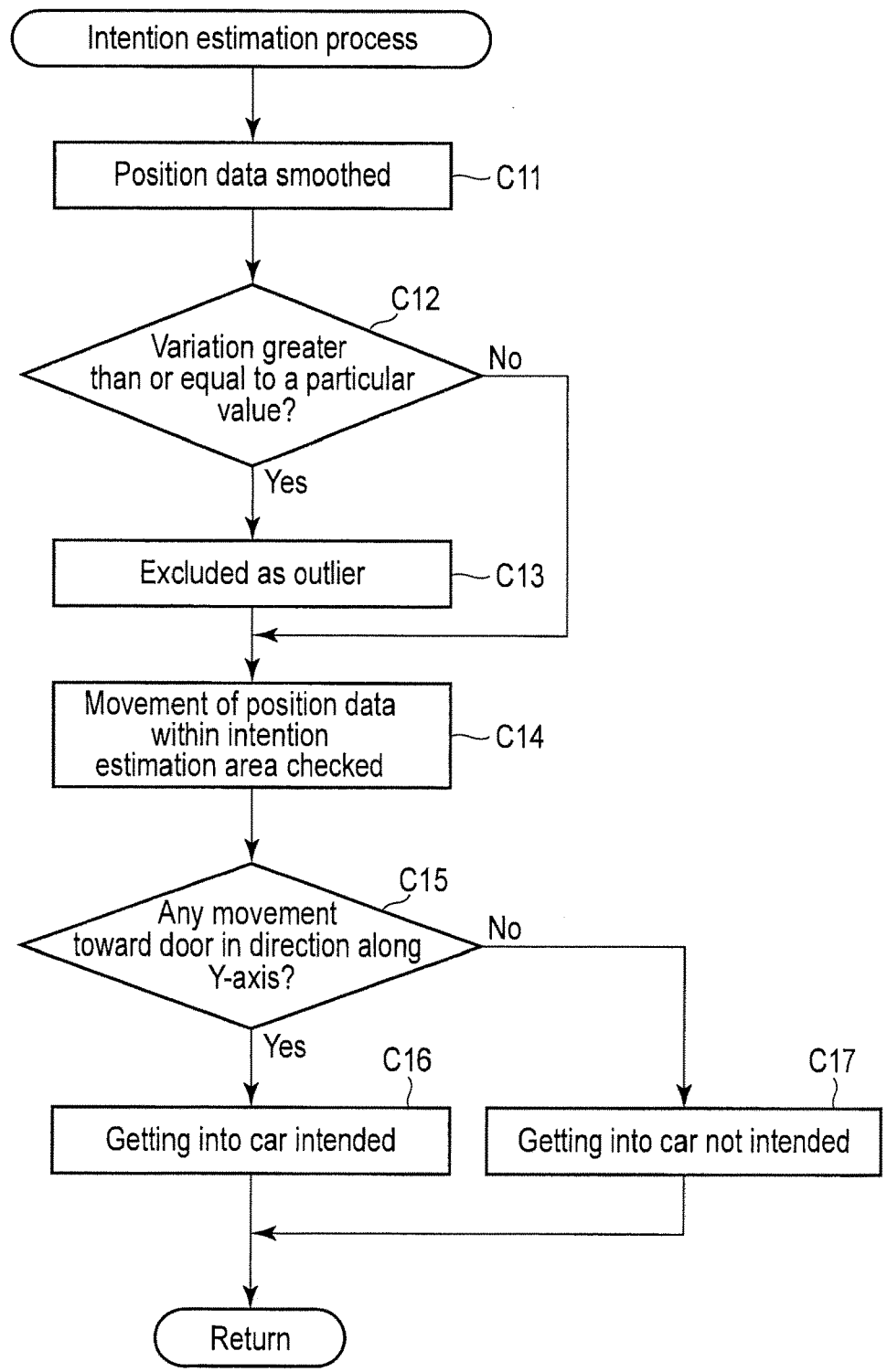
FIG. 11 is a flowchart showing an intention estimation process of the elevator system according to the embodiment.

FIG. 11 is a flowchart showing the intention estimation process of step S14*c* described above. The intention estimation process is executed in the intention estimation module 22*c*, which is one of the constituent elements of the passenger detection module 22.

The intention estimation module 22*c* smoothes the data on the position of the passenger's foot of each of the images stored in the second buffer area (step C11). Note that as a method of smoothing, a method which is generally known such as an average value filter or a Kalman filter is to be used, and the details of the adopted method will not be described here.

When the data on the position of the foot is smoothed, if there exists data whose variation in the position of the foot is greater than or equal to a particular value (Yes in step C12), the intention estimation module 22*c* excludes such data as an outlier (step C13). Note that the particular value is determined by the passenger's normal walking speed, and a frame rate of the captured image. Also, an outlier may be found and excluded before smoothing the data on the position of the foot.

Figure 12:
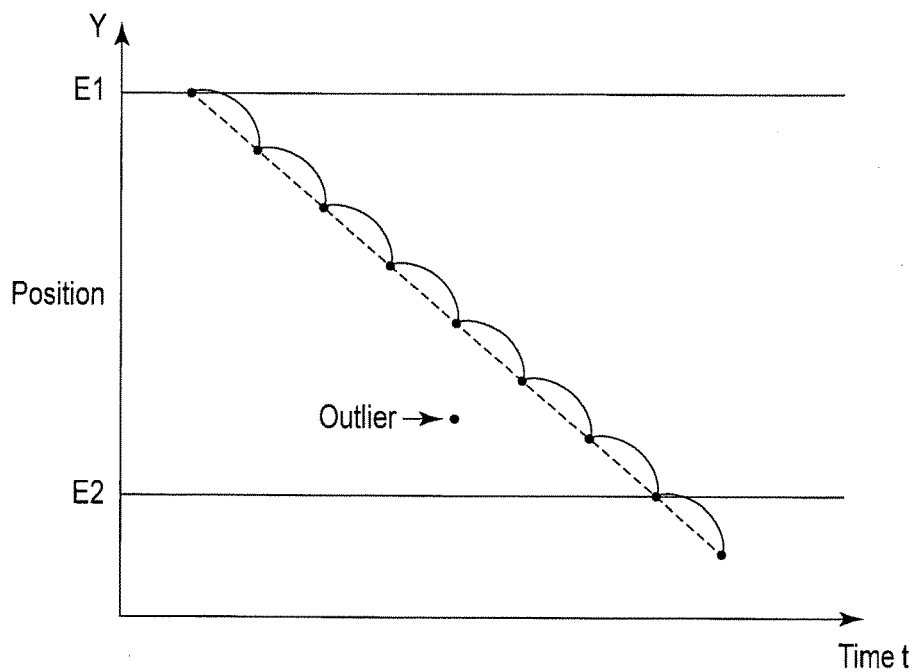
FIG. 12 is a graph showing a state of change of a position of a foot of a person who intends to get into the car according to the embodiment.

FIG. 12 shows the state of change of the position of the foot. The horizontal axis represents time, and the vertical axis represents position (the Y-coordinate value). In the case where the passenger is walking toward the car door 13 from the hall 15, as time elapses, the Y-coordinate value of the position of the passenger's foot is gradually decreased.

Note that a change in data is expressed as a line as shown by a dotted line if the movable body is a wheelchair, for example. However, if the movable body is a passenger, since right and left feet are alternately detected, a change in data is expressed as a curve as shown by a solid line. Also, if some kind of noise intrudes into a detection result, an instantaneous variation in the position of the foot becomes large. Data on the position of the foot with such a large variation is excluded as an outlier.

Hence, the intention estimation module 22*c* checks the movement of the foot position (data change) in the intention estimation area E2 shown in FIG. 2 (step C14). As a result of checking, when movement of the position of the foot (data change) of the passenger who is proceeding toward the car door 13 in the direction along the Y-axis within the intention estimation area E2 is acknowledged (Yes in step C15), the intention estimation module 22*c* estimates that the passenger intends to get into the car (step C16).

Figure 13:
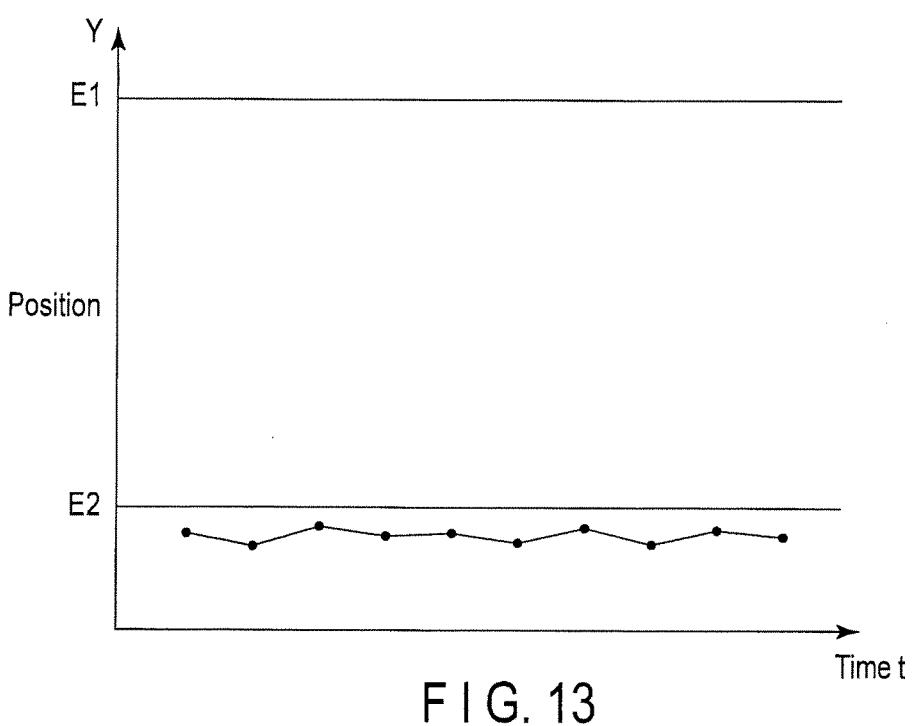
FIG. 13 is a graph showing a state of change of a position of a foot of a person who does not intend to get into the car according to the embodiment.

Meanwhile, when movement of the position of the foot of the passenger who is proceeding toward the car door 13 in the direction along the Y-axis within the intention estimation area E2 could not be acknowledged (No in step C15), the intention estimation module 22*c* estimates that the passenger does not intend to get into the car (step C17). For example, when a person walks across the hall on the front side of the car 11 in the direction along the X-axis, foot positions which do not temporally change in the direction along the Y-axis within the intention estimation area E2 are detected, as shown in FIG. 13. In such a case, the movement is estimated as the one of a person having no intention of getting into the car.

As can be seen, a block representing movement which is the closest to the car door 13 is assumed as the position of the passenger's foot, and by tracking a temporal change in the direction along the Y-axis of the position of the foot, whether or not the passenger intends to get into the car is estimated.

Returning to FIG. 8, when a passenger who intends to get into the car is detected (Yes in step S15), a passenger detection signal is transmitted from the image processor 20 to the car controller 30. As the car controller 30 receives the passenger detection signal, the car controller 30 prohibits the door closing operation of the car door 13 and maintains the door-opened state (step S16).

More specifically, when the car door 13 is in a full door-opened state, the car controller 30 starts counting of an door-opened time, and when a particular time T (for example, one minute) has been counted, the door is closed. During this time, when a passenger who intends to get into the car is detected, and the passenger detection signal is sent, the car controller 30 stops the counting and clears the count value. In this way, during the above time T, the door-opened state of the car door 13 is maintained.

Note that when a new passenger who intends to get into the car is detected during this time, the count value is cleared again, and for the time T, the door-opened state of the car door 13 is maintained. However, if passengers arrive many times during the time T, a situation that the car door 13 cannot be closed continues endlessly. For this reason, preferably, an allowance time Tx (for example, 3 minutes) should be set, and when the allowance time Tx has elapsed, the car door 13 should be closed mandatorily.

When the counting of the above time T has finished (step S17), the car controller 30 closes the car door 13, and allows the car 11 to depart for the destination floor (step S18).

As can be seen, according to the present embodiment, by analyzing an image of the hall 15 captured by the camera 12 installed at the upper part of the doorway of the car 11, it is possible to detect a passenger who is proceeding toward the car door 13 from a place some distance away from the car 11, for example, and reflect this information in the door opening/closing operation.

In particular, the position of the passenger's foot is closely observed in the captured image, and a temporal change of the position of the foot in the direction from the car door 13 to the hall 15, and vice versa (i.e., the direction along the Y-axis) is followed. In this way, it is possible to prevent a person who has just passed near the car from being erroneously detected, and to correctly detect only the passengers who wish to get into the car and have the detected information reflected in the door opening/closing operation. In this case, since the door-opened state is maintained while a passenger who intends to get into the car is being detected, a situation that the passenger is hit by the door as the door closing operation is started when he/she steps into the car 11 can be avoided.

Other Embodiments

The above embodiment has been described by focusing on only the passenger who gets into the car 11, but there are cases where the passenger gets off the car 11 when the car 11 arrives at the hall 15 and the door is opened. When the passenger gets off the car 11, since the position of the foot of this passenger in the direction from the car door 13 to the hall 15 (the direction along the Y-axis) is detected, the passenger may be erroneously detected as a person who intends to get into the car 11.

Generally, when there are a passenger who gets off the car 11 and a passenger who gets into the car 11, it is often the case that these passengers keep a distance from each other on the right and left of the car door 13 and get on or off the car. Hence, as shown in FIG. 14, regions E3 and E4 which are the divided regions on the right and left in the direction along the Y-axis with reference to the center of the car door 13 are set. Further, in detecting a block representing movement in a captured image by the passenger detection module 22 shown in FIG. 1, a detection operation is to be performed by focusing on a region which shows movement of a person/object proceeding toward the car door 13.

Referring to the example of FIG. 14, an image portion of the passenger who gets into the car 11 in region E3 of the captured image, and an image portion of the passenger who gets off the car 11 in region E4 of the same are detected as those showing movement. In such a case, although a block closest to the car door 13 is block B4 included in image portion P4, a block representing movement toward the car door 13 is block B3 included in image portion P3. Accordingly, block B4 is disregarded, and by following the position of block B3 by focusing on region E3, a passenger who intends to get into the car is detected.

Further, in the example of FIG. 14, while the captured image is divided into two regions on the right and left, the captured image may be divided into regions of more than two. That is, by focusing on a region showing movement of a person/object proceeding toward the car door 13 among these regions, a passenger who intends to get into the car may be detected.

As can be seen, by focusing on a region showing movement of a person/object proceeding toward the car door 13, it is possible to correctly detect a passenger who will get into the car 11 without erroneously detecting a passenger who is getting off the car 11, and reflect this in the door opening/closing operation.

Note that when the camera 12 is to be installed in the car 11, depending on the state of the place where the camera is to be installed, the camera may have to be installed in an inclined position. In such a case, a coordinate system in the real space shown in FIG. 5 may be deviated from a coordinate system in the captured image, and the passenger's movement cannot be correctly detected.

Figure 15:
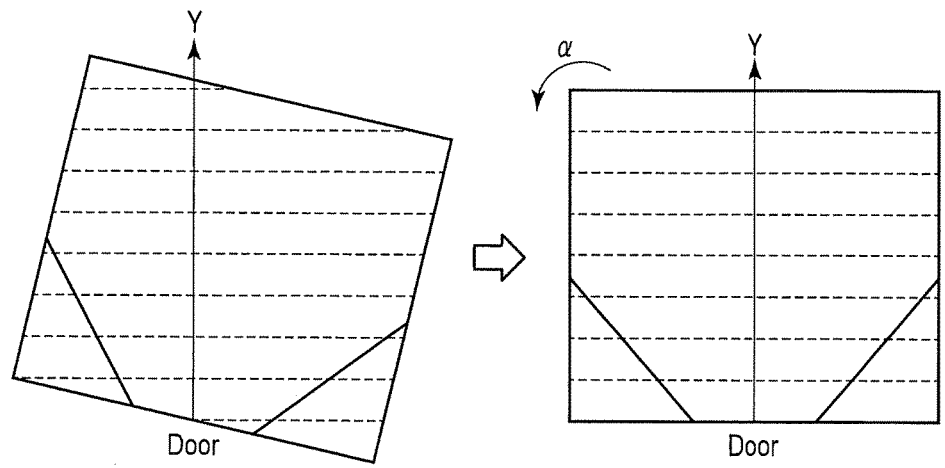
FIG. 15 is an illustration for describing a method which can be adopted when a camera is installed in an inclined position according to another embodiment.
Figure 16:
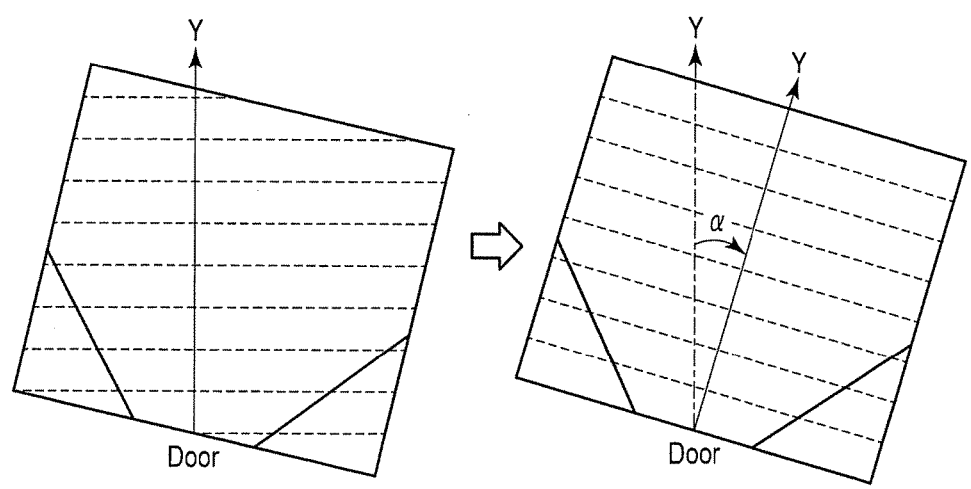
FIG. 16 is an illustration for describing a method which can be adopted when a camera is installed in an inclined position according to yet another embodiment.

Hence, when the camera 12 is installed in an inclined position, as shown in FIG. 15, it is assumed that movement detection is carried out after an inclination of each image is corrected with reference to the Y-axis in the real space in accordance with the installation angle (tilt angle) $\alpha$ of the camera 12. Further, alternatively, as shown in FIG. 16, movement detection may be carried out after correcting an inclination of the Y-axis in each of the image in accordance with the installation angle (tilt angle) a of the camera 12.

Furthermore, although the above embodiment has been described assuming a state where the car door 13 of the car 11 is opened in the hall 15, also when the car door 13 is closing, whether there is a passenger who intends to get into the car is detected by using the images captured by the camera 12. When a passenger who intends to get into the car is detected, the door closing operation of the car door 13 is interrupted by the door opening and closing controller 31 of the car controller 30, and the door opening operation is executed again.

Figure 17:
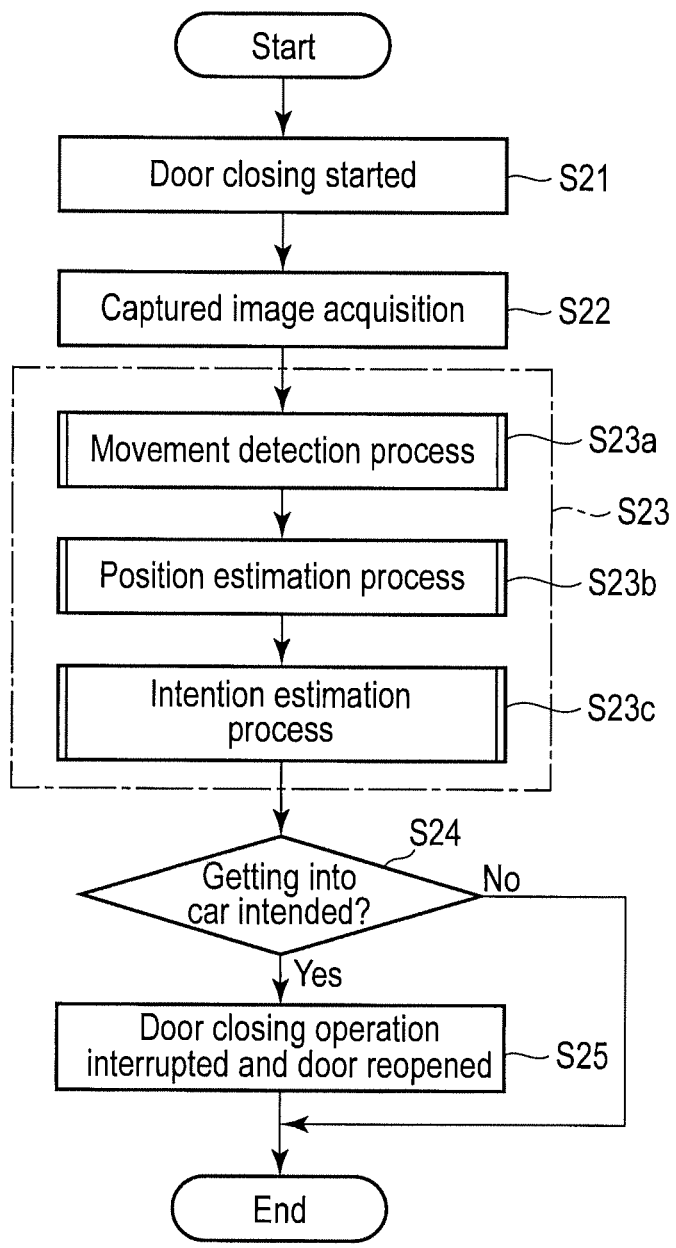
FIG. 17 is a flowchart showing a process operation at the time the car door is closing by an elevator system according to another embodiment.

In the following, a process operation at the time the door is closing will be described referring to a flowchart of FIG. 17.

When a particular time elapses from the state that the car door 13 of the car 11 is fully open, a door closing operation is started by the door opening and closing controller 31 (step S21). At this time, an image capturing operation of the camera 12 is continuously performed. The image processor 20 acquires images captured by the camera 12 on a time-series basis, and by sequentially saving these images in the storage 21 (step S22), a passenger detection process is executed in real time (step S23).

The passenger detection process is executed by the passenger detection module 22 provided in the image processor 20. The passenger detection process is categorized into a movement detection process (step S23a), a position estimation process (step S23b), and an intention estimation process (step S23c). Since these processes are similar to those in steps S14a, S14b, and S14c of FIG. 8, detailed descriptions of them are omitted.

When a passenger who intends to get into the car is detected (Yes in step S24), a passenger detection signal is transmitted from the image processor 20 to the car controller 30. When the car controller 30 receives the passenger detection signal while the door is being closed, the car controller 30 interrupts the door closing operation of the car door 13 and performs the door opening operation again (i.e., reopening of the door) (step S25).

After this, returning to step S12 in FIG. 8, processes similar to those described above are repeated. However, if passengers who intend to get into the car are continuously detected while the door is being closed, the reopening is repeated, and a departure of the car 11 is delayed. Accordingly, even if a passenger who intends to get into the car is detected, if the above allowance time Tx (for example, three minutes) has passed, preferably, the door should be closed without being reopened.

As described above, whether or not there is a passenger who intends to get into the car is detected even when the door is closing, and the detection result can be reflected in the door opening/closing operation. Accordingly, a situation, which is that the passenger is hit by the door when he/she steps into the car 11 whose door is closing, can be avoided.

According to at least one of the embodiments described above, it is possible to provide an elevator system capable of correctly detecting a passenger who intends to get into the car in a wide rage, and reflecting the detected information in the opening/closing control of the door.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. An elevator system comprising:
    a camera capable of imaging a particular range in a direction from a vicinity of a door of a car to a hall when the car arrives at the hall;
    a passenger detection module which detects presence or absence of a passenger who intends to get into the car by focusing on movement of a movable body within a specific area by using a plurality of time-series continuous images which are captured by the camera; and a controller which controls an opening/closing operation of the door based on a detection result of the passenger detection module, a width of the area being set greater than at least a width of the door, wherein the passenger detection module comprises:

a movement detection module which detects movement of the movable body by comparing brightness of each of the images in units of one block;

a position estimation module which extracts a block representing movement detected for each of the images by the movement detection module, and estimates a coordinate position in a direction of the hall obtained from a center of the door as the passenger's position; and an intention estimation module which estimates whether the passenger intends to get into the car based on a time-series change of positions estimated by the position estimation module.

2. The elevator system of claim 1, wherein:

the position estimation module estimates the coordinate position in the direction of the hall obtained from the center of the door in the block representing movement as a position of the passenger's foot; and the intention estimation module estimates that the passenger intends to get into the car when a state in which the position of the passenger's foot approaches the door in the area is detected.

3. The elevator system of claim 1, wherein the intention estimation module excludes a position having a change greater than or equal to a specific value in the time-series change of the positions estimated by the position estimation module as an outlier.

4. The elevator system of claim 1, wherein the passenger detection module divides each of the images into a plurality of regions with reference to a center of the door, and by focusing on a region showing movement of the movable body proceeding to the door in these regions, presence or absence of a passenger who intends to get into the car is detected.

5. The elevator system of claim 4, wherein the passenger detection module divides each of the images into two regions on right and left with reference to the center of the door.

6. The elevator system of claim 1, wherein:

the camera is installed at an upper part of a doorway of the car; and an image in which a direction horizontal to the door is assumed as an X-axis, a direction from a center of the door to the hall is assumed as an Y-axis, and a direction of a height of the car is assumed as a Z-axis is captured.

7. The elevator system of claim 6, wherein the passenger detection module detects presence or absence of a passenger who intends to get into the car by focusing on movement of the movable body proceeding toward the door in a state in which an inclination of each of the images is corrected with reference to the Y-axis in accordance with an installation angle of the camera.

8. The elevator system of claim 6, wherein the passenger detection module detects presence or absence of a passenger who intends to get into the car by focusing on movement of the movable body proceeding toward the door in a state in which an inclination of the Y-axis in each of the images is corrected in accordance with an installation angle of the camera.

9. An elevator system comprising:

a camera capable of imaging a particular range in a direction from a vicinity of a door of a car to a hall when the car arrives at the hall;

a passenger detection module which detects presence or absence of a passenger who intends to get into the car by using a plurality of time-series continuous images which are captured by the camera, detecting movement of a movable body by comparing brightness of each of the images in units of one block in a particular area, extracting a block representing movement detected for each of the images, estimating a coordinate position in a direction of the hall obtained from a center of the door as the passenger's position, and estimating whether the passenger intends to get into the car based on a time-series change of estimated coordinated positions; and a controller which controls an opening/closing operation of the door based on a detection result of the passenger detection module.

* * * * *